(12) United States Patent
Lee

(10) Patent No.: US 8,351,712 B2
(45) Date of Patent: Jan. 8, 2013

(54) METHODS AND APPARATUS TO PERFORM IMAGE CLASSIFICATION BASED ON PSEUDORANDOM FEATURES

(75) Inventor: Morris Lee, Palm Harbor, FL (US)

(73) Assignee: The Neilsen Company (US), LLC, Schaumburg, IL (US)

( * ) Notice: Subject to any disclaimer, the term of this patent is extended or adjusted under 35 U.S.C. 154(b) by 926 days.

(21) Appl. No.: 12/430,717

(22) Filed: Apr. 27, 2009

(65) Prior Publication Data

US 2010/0272350 A1    Oct. 28, 2010

(51) Int. Cl.
   G06K 9/62    (2006.01)
(52) U.S. Cl. .................................. 382/224; 382/159
(58) Field of Classification Search .................. 382/118, 382/159, 224
   See application file for complete search history.

(56) References Cited

U.S. PATENT DOCUMENTS

| | | |
|---|---|---|
| 4,858,000 A | 8/1989 | Lu |
| 5,031,228 A | 7/1991 | Lu |
| 5,331,544 A | 7/1994 | Lu et al. |
| 5,901,244 A | 5/1999 | Souma et al. |
| 6,009,199 A * | 12/1999 | Ho ................................ 382/224 |
| 6,128,397 A | 10/2000 | Baluja et al. |
| 6,134,344 A | 10/2000 | Burges |
| 6,157,921 A | 12/2000 | Barnhill |
| 6,421,463 B1 | 7/2002 | Poggio et al. |
| 6,671,391 B1 | 12/2003 | Zhang et al. |
| 6,944,319 B1 | 9/2005 | Huang et al. |
| 6,975,750 B2 | 12/2005 | Yan et al. |
| 6,990,217 B1 | 1/2006 | Moghaddam et al. |
| 7,050,607 B2 | 5/2006 | Li et al. |
| 7,092,555 B2 | 8/2006 | Lee et al. |
| 7,095,879 B2 | 8/2006 | Yan et al. |
| 7,127,087 B2 | 10/2006 | Huang et al. |
| 7,146,050 B2 | 12/2006 | Lienhart et al. |
| 7,174,029 B2 | 2/2007 | Agostinelli et al. |
| 7,174,040 B2 | 2/2007 | Lienhart et al. |
| 7,324,671 B2 | 1/2008 | Li et al. |
| 7,362,886 B2 | 4/2008 | Rowe et al. |
| 7,440,930 B1 | 10/2008 | Brandt |
| 7,460,693 B2 | 12/2008 | Loy et al. |
| 2003/0202704 A1 | 10/2003 | Moghaddam et al. |
| 2010/0067793 A1* | 3/2010 | Serrano et al. ................ 382/179 |

FOREIGN PATENT DOCUMENTS

WO    03091990    11/2003

OTHER PUBLICATIONS

Balcázar et al., "Provably Fast Support Vector Regression Using Random Sampling," Proceedings of SIAM Workshop in Discrete Mathematics and Data Mining, 2002 (8 pages).
Balcázar et al., "A Random Sampling Technique for Training Support Vector Machines (For Primal-Form Maximal-Margin Classifiers)," Proceedings of Algorithmic Learning (ALT '01), 2001 (16 pages).

(Continued)

*Primary Examiner* — John Strege
(74) *Attorney, Agent, or Firm* — Hanley, Flight & Zimmerman, LLC

(57) ABSTRACT

Example methods and apparatus to perform image classification based on pseudorandom features are disclosed. A disclosed example method includes generating first and second pseudorandom numbers, extracting a first feature of an image based on the first and second pseudorandom numbers, and determining a classification for the image based on the first extracted feature.

26 Claims, 4 Drawing Sheets

OTHER PUBLICATIONS

Moghaddam et al., "Gender Classification with Support Vector Machines," Proceedings of the 4th IEEE International Conference on Face and Gesture Recognition, Mar. 2000 (10 pages).

Viola et al., "Robust Real-time Object Detection," Second International Workshop on Statistical and Computational Theories of Vision—Modeling, Learning, Computing, and Sampling, Jul. 13, 2001 (25 pages).

Moghaddam et al., "Sex with Support Vector Machines," Advances in Neural Information Processing Systems 13, 2001 (7 pages).

Chang et al., "LIBSVM: a Library for Support Vector Machines", Department of Computer Science, National Taiwan University, Feb. 27, 2009 (30 pages).

Jain et al., "Integrating Independent Components and Support Vector Machines for Gender Classification," Proceedings of the 17th International Conference on Pattern Recognition (ICPR '04), 2004 (4 pages).

Huang et al., "Labeled Faces in the Wild: A Database for Studying Face Recognition in Unconstrained Environments," University of Massachusetts, Amherst, Technical Report 07-49, Oct. 2007 (3 pages).

Trumedia, "iTally—Opportunity to See (OTS) People Counter", TruMedia—Audience Measurement Systems, (http://trumedia.co.il/inside.asp?ID=27), retrieved Mar. 12, 2009 (2 pages).

Trumedia, "iGaze—Consumer Behavior Measurement System", TruMedia—Audience Measurement Systems, (http://trumedia.co.il/inside.asp?ID=29), retrieved Mar. 12, 2009 (3 pages).

Trumedia, "Measuring In-Store Shopper Engagement", TruMedia—Audience Measurement Systems, (http://trumedia.co.il/inside.asp?ID=50), retrieved Mar. 12, 2009 (1 page).

Trumedia, "TruMedia Technologies", TruMedia—Audience Measurement Systems, (http://tru-media.com), retrieved Mar. 12, 2009 (1 page).

* cited by examiner

```
302 ──→  ml_srand = 0;
         npair = 1000;
         for (ip = 1; ip <= npair; ++ip) {
305 { 310 {   x3 = (int) (ml_rand() * image->w/3 + image->w/3);
              y3 = (int) (ml_rand() * image->h/3 + image->h/3);
     315 {   dx = (int) (ml_rand() * 10.0);
              dy = (int) (ml_rand() * 10.0);
              ave = 0;
     320 {   for (x4 = x3 - dx; x4 <= x3 + dx; ++x4) {
                  for (y4 = y3 - dy; y4 <= y3 + dy; ++y4) {
                      getpixel(image, x4, y4, &r, &g, &b);
                      ave += g;
                  }
              }
              ave = (int)(ave / ((2.0*dx + 1.0) * (2.0*dy + 1.0)));
         }
```

```
      double ml_rand()
      {
405 {   ml_srand = (1366 * ml_srand + 150889) % 714025;
        return(ml_srand / 714025.0);
      }
```

METHODS AND APPARATUS TO PERFORM IMAGE CLASSIFICATION BASED ON PSEUDORANDOM FEATURES

FIELD OF THE DISCLOSURE

This disclosure relates generally to image classification and, more particularly, to methods and apparatus to perform image classification based on pseudorandom features.

BACKGROUND

Support vector machines (SVMs) belong to a class of classifiers known as linear classifiers. An SVM may be trained using a set of images having known classifications. Each image has an associated set of features, which may be represented as a so-called "feature vector" in an n-dimensional space. Based on the feature vectors and known classifications for a set of images, the SVM determines one or more separating hyperplanes in the n-dimensional space that maximizes the margin(s) and/or distance(s) between subsets of the images having different classifications. When a previously unclassified image is to be classified, features of the image are extracted (e.g., calculated and/or otherwise determined), a corresponding feature vector is formed based on the image features, and the SVM classifies the image by determining, based on the separating hyperplane(s), in which portion of the n-dimensional space the feature vector is located. Example deterministic image features include, but are not limited to, brightness, color, position, feature size, edge strength, and/or edge direction. Such deterministic image features are computed using purpose-built and/or purposefully designed algorithms and/or methods that extract particular and/or definable characteristics of an image. Example deterministic features of an image of a face include, but are not limited to, a distance between the eyes, a dimension of an area defined by the eyes and nose, a dimension of a mouth, etc.

DETAILED DESCRIPTION

Example methods and apparatus to perform image classification based on pseudorandom features are disclosed. A disclosed example method includes generating first and second pseudorandom numbers, extracting a first feature of an image based on the first and second pseudorandom numbers, and determining a classification for the image based on the first extracted feature.

A disclosed example apparatus includes a pseudorandom number generator to generate one or more pseudorandom numbers, a feature extractor to extract a first feature of an image based on the one or more pseudorandom numbers, and a classifier to determine a classification for the image based on the first extracted feature.

Figure 1:
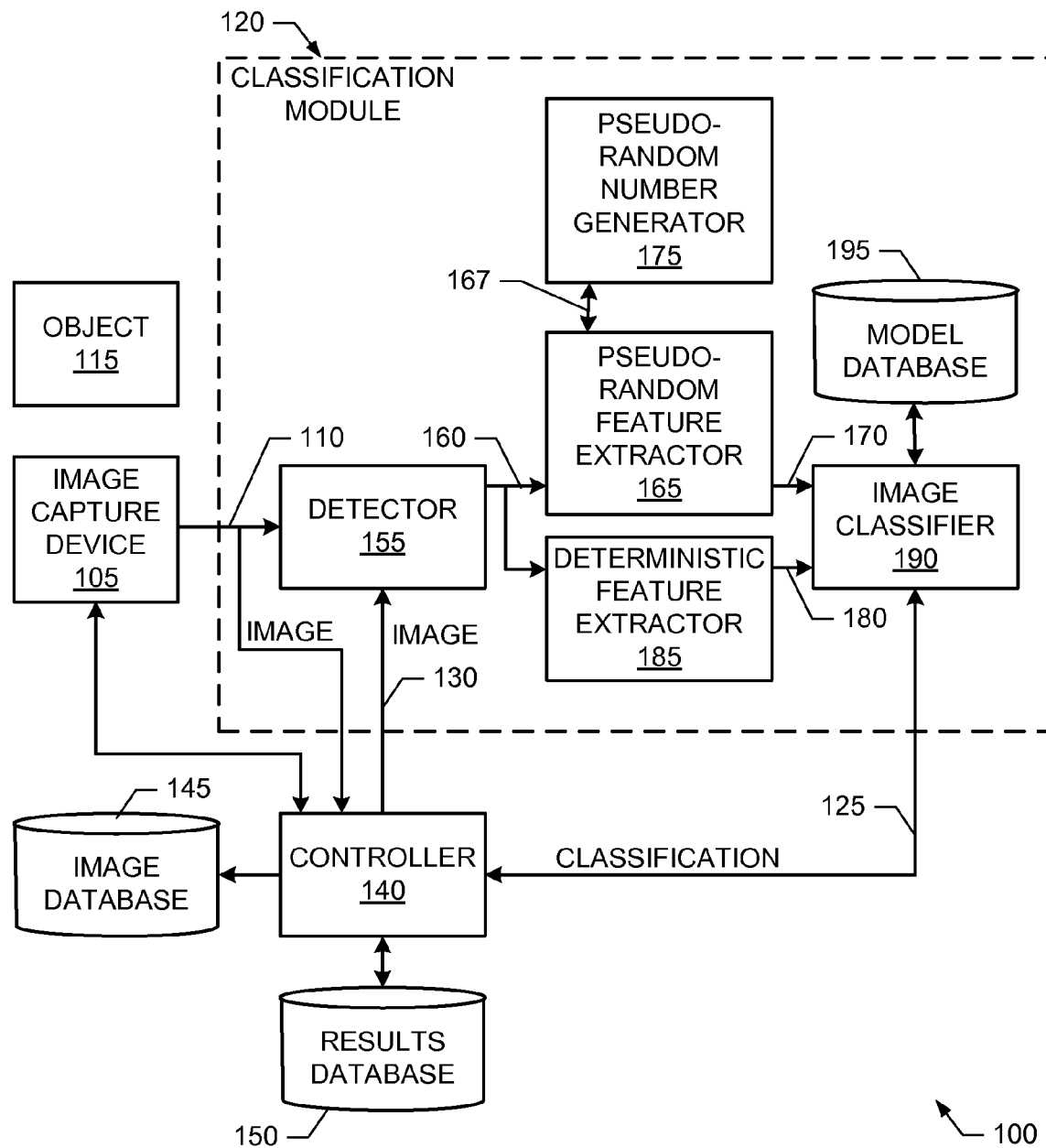
FIG. 1 is a schematic illustration of an example image classifying apparatus constructed in accordance with the teachings of this disclosure.

FIG. 1 is a schematic illustration of an example image classifying apparatus 100. To capture images, the example image classifying apparatus 100 of FIG. 1 includes any number and/or type(s) of image capture devices, one of which is designated at reference numeral 105. The image capture device(s) 105 are capable to, adapted to and/or configurable to acquire, capture and/or otherwise obtain an image 110 that represents all or any portion(s) of an object 115. Example image capture devices 105 include, but are not limited to, a digital camera and/or an image sensor. The example image 110 of FIG. 1 may be, for example, a digital picture 110 of a person 115.

To classify images, the example image classifying apparatus 100 of FIG. 1 includes a classification module 120. As described below, using the example image 110 captured by the example image capture device 105, the example classification module 120 of FIG. 1 determines a classification 125 for the object 115. That is, the example classification module 120 determines to which of a plurality and/or set of classifications the object 115 belongs. For example, the classification module 120 may be used to determine (e.g., classify) the gender of the person 115. However, the example classification module 120 may be used to classify any number and/or type(s) of images 110 based on any number and/or type(s) of classifications. As described below, the example classification module 120 may be trained by, for example, providing training images 130 and corresponding known classifications 125 to the classification module 120.

To control the capturing and classification of images 110, the example image classification image apparatus 100 of FIG. 1 includes any number and/or type(s) of controllers, one of which is designated at reference numeral 140. The example controller 140 of FIG. 1 can, among other things, control when and/or how the image capture device 105 captures the image 110. For example, the controller 140 can implement a detector (not shown) to detect when the person 115 is in die vicinity of the image classifying apparatus 100, direct the image capture device 105 to take a picture 110 of the detected person 115, and/or direct the classification module 120 to identify the gender 125 of the person 115. By so operating, the example image classification image apparatus 100 of FIG. 1 can, for example, tabulate how many persons of each gender enter, for example, a store, a shopping area, a sporting area, a museum, a transportation terminal, a government office, a public area, and/or a private area.

To store images, the example image classifying apparatus 100 of FIG. 1 includes an image database 145. As permitted by law, and/or public and/or private regulation(s) and/or rule(s), each image 110 captured by the example image capture device 105 can be stored in the image database 145. The training images 130 provided by the example controller 140 to the example classification module 120 to train the example classification module 120 may, in some examples, be stored in and/or retrieved from the image database 145. Alternatively, the classification module 120 can be trained prior to the image classifying apparatus 100 being installed such that the training images 130 need not be stored in the image database 145. The images 110, 130 may be stored in the example image database 145 of FIG. 1 using any number and/or type(s) of data structures. The example image database 145 may be stored in and/or implemented by any number and/or type(s) of tangible storage medium(s), memory(-ies) and/or memory device(s).

To store image classification results, the example image classifying apparatus 100 of FIG. 1 includes a results database 150. Classification results may be stored in the example results database 150 of FIG. 1 using any number and/or type (s) of data structures, and the example results database 150 may be stored in and/or be implemented by any number and/or type(s) of tangible storage medium(s), memory(-ies) and/or memory device(s). An example data structure that may be used to implement the example results database 150 of FIG. 1 is described below in connection with FIG. 5.

To pre-process captured image(s) 110, the example classification module 120 includes a detector 155. Using any number and/or type(s) of algorithm(s), method(s) and/or logic, the example detector 155 of FIG. 1 processes the image 110 to identify one or more regions of interest of the image 110, and/or to scale and/or normalize such regions of interest to form a normalized image 160. In some examples, the detector 155 identifies a portion of the image 110 substantially corresponding to the face of a person 115, and normalizes the identified facial portion of the image 110 such that the facial portion is represented by a desired and/or predefined number of pixels, has a desired brightness, has a desired contrast, represents a frontal (i.e., non side) view of the face of the person 115, and/or converts the image to grayscale. Example methods and apparatus that may be used to implement the example detector 155 are described by Viola et al. in a paper entitled "Robust Real-Time Object Detection," published in connection with the Second International Workshop on Statistical and Computing Theories of Vision—Modeling, Learning, Computing and Sampling, Vancouver, Canada, Jul. 13, 2001, and which is hereby incorporated by reference in its entirety.

While the illustrated example classification module 120 of FIG. 1 includes the example detector 155, some example implementations omit the detector 155. For example, if the image capture device 105 is configured to capture an image 110 of only a desired portion of the object 115 with sufficient and/or consistent illumination to obviate the need for normalization, the detector 155 may not be needed. In general, the example detector 155 of FIG. 1 isolates and/or conditions a portion of the image 110 that is relevant to classification of the object 115 by the example classification module 120. As such, implementation of the detector 155 may be specific to the type(s) of objects 115 to be classified.

To extract image features, the example classification module 120 of FIG. 1 includes a pseudorandom feature extractor 165. Based on a pseudorandom sequence of numbers 167, the example pseudorandom feature extractor 165 of FIG. 1 extracts (e.g., computes) one or more pseudorandom features 170 of the normalized image 160. As described below in connection with the example machine-accessible instructions of FIG. 3, the example pseudorandom feature extractor 165 samples the normalized image 160 at substantially random locations and with substantially random resolutions. However, other types of pseudorandom image features 170 can be computed based on the pseudorandom sequence of numbers 167 and/or any other pseudorandom number sequence.

To generate the pseudorandom sequence of numbers 167, the example classification module 120 of FIG. 1 includes a pseudorandom number generator 175. Using any number and/or type(s) of method(s), device(s), logic and/or algorithm (s), the example pseudorandom number generator 175 of FIG. 1 generates the sequence of numbers 167 to have, to satisfy, and/or to approximate one or more properties of random numbers. For example, the numbers 167 may be generated to have a substantially uniform distribution. While the example pseudorandom number sequence 167 is not actually random because the sequence 167 is determined by an initial value (e.g., a seed and/or a state of the pseudorandom number generator 175), the sequence of numbers 167 substantially approximates a sequence of random numbers and, thus, can be considered to be effectively random in nature. Example method(s), algorithm(s), apparatus and/or device(s) that may be used to implement the example pseudorandom number generator 175 include, but are not limited to, a linear congruential generator, a lagged Fibonacci generator, a linear feedback shift register, a generalized feedback shift register, the Blum Blum Shub algorithm, the Fortuna algorithm, and/or the Mersenne twister algorithm. Example machine-accessible instructions that may be executed to implement the example pseudorandom number generator 175 are described below in connection with FIG. 4.

Because the pseudorandom sequence of numbers 167 are substantially random and selected independent of the normalized image 160, the pseudorandom image features 170 extracted by the example pseudorandom features extractor 165 of FIG. 1 are substantially random relative to the normalized image 160. That is the extracted features 170 have no deterministic relationship to actual features (e.g., distance between eyes, width of face, etc.) that may be depicted in the normalized image 160. Instead, the use of the example pseudorandom features 170 to classify images facilitates use of a large (e.g., nearly limitless) set of image features without having to commit to use of any particular deterministic feature(s). Moreover, the computation of the pseudorandom features 170 will, in general, be of significantly lower complexity than the computation of deterministic image feature.

So that the same pseudorandom features 170 are computed for each normalized image 160, the state and/or seed of the pseudorandom number generator 175 is set and/or reset before each image 160 is processed. By setting and/or resetting the state and/or seed of the pseudorandom number generator 175 before processing each image 160, the sequence of pseudorandom numbers 167 used for each normalized image 160 is identical. Thus, the same pseudorandom features 170 are computed for each normalized image 160 even while the set of features 170 are effectively random relative to the normalized image 160.

To extract (e.g., compute) deterministic image features 180, the example classification module 120 may optionally include any number and/or type(s) of deterministic feature extractors, one of which is designated at reference numeral 185. Example deterministic features 180 that may be computed by the example deterministic feature extractor 185 include, but are not limited to, a brightness, a color, a position, a feature size, an edge strength, an edge direction, a distance between the eyes, a dimension of an area defined by the eyes and nose, and/or a mouth dimension. In the illustrated example, the deterministic image features 180 are computed using purpose-built and/or purposefully designed algorithms, devices and/or methods that extract particular and/or definable characteristics of the normalized image 160. Moreover, such algorithms are responsive to the characteristics of the normalized image 160. In contrast, in some examples described below in connection with FIGS. 3 and 4, the example pseudorandom image features 170 of FIG. 1 are computed by randomly sampling the normalized image 160 with random resolutions. Such operations do not depend on nor change based on the characteristics of the normalized image 160. Other example pseudorandom image features 170 include, but are not limited to vertical edge strength at a random location, horizontal edge strength at a random location, color at a random location, and/or predominate edge direction at a random location. While such features 170 may be computed using deterministic algorithms, they are still referred to herein as pseudorandom features 170 since one or more input parameters, such as location, are determined based on one or more pseudorandom numbers. It should be appreciated that the deterministic image features 180 cannot be computed based on the pseudorandom number sequence 167 as the use of the pseudorandom numbers 167 would render the deterministic feature extractor 185 inoperable and/or incapable to correctly extract the intended deterministic features 180.

To classify images, the example classification module 120 includes any number and/or type(s) of image classifiers, one of which is designated at reference numeral 190. Using any number and/or type(s) of algorithm(s), method(s), logic, and/or device(s), the example image classifier 190 of FIG. 1 classifies the normalized image 160 based on the pseudorandom image features 170 and, optionally, the deterministic image features 180. Taken together the pseudorandom image features 170 and the deterministic image features 180 represent an image feature vector for the normalized image 160. Based on the image feature vector, the example image classifier 190 determines the classification 125 for the normalized image 160. The example image classifier 190 of FIG. 1 may be implemented with any support vector machine (SVM). An example library that may be used to implement an SVM to classify images based on image feature vectors and/to train an SVM is described by Chang et al., in a paper entitled "LIB-SVM: a library for support vector machines," dated Feb. 27, 2009, available from the National Taiwan University public archives (at the time of filing, this was publicly available at http://www.csie.ntu.edu.tw/~cjlin/libsvm), and which is hereby incorporated by reference in its entirety.

To store a classification model, the example classification module 120 includes a model database 195. The example model database 195 contains one or more parameters and/or variables that define one or more scale factors and/or hyperplanes that may be used classify the normalized image 160 and, thus, the corresponding object 115, based on the example image features 170. In some examples, the classification of the normalized image 160 is also based on the image features 180. The data structure(s) used to store the parameters and/or variables in the model database 195 may depend on the particular image classifier 190 that is implemented. The example model database 195 may be implemented with any number and/or type(s) of tangible storage medium(s), memory(-ies) and/or memory device(s). In some examples, the model database 195 stores a pre-trained model for use by the example image classifier 190. Additionally or alternatively, the example image classifier 190 trains, adapts, selects and/or updates the variables and/or parameters of the model database 195 based on provided training images 130 having known provided classifications 125.

While an example image classifying apparatus 100 has been illustrated in FIG. 1, one or more of the interfaces, data structures, elements, processes and/or devices illustrated in FIG. 1 may be combined, divided, re-arranged, omitted, eliminated and/or implemented in any other way. Further, the example image capture device 105, the example classification module 120, the example controller 140, the example databases 145, 150 and 195, the example detector 155, the example pseudorandom feature extractor 165, the example pseudorandom number generator 175, the example determin- istic feature extractor 185, the example image classifier 190 and/or, more generally, the example image classifying apparatus 100 of FIG. 1 may be implemented by hardware, software, firmware and/or any combination of hardware, software and/or firmware. Thus, for example, any of the example image capture device 105, the example classification module 120, the example controller 140, the example databases 145, 150 and 195, the example detector 155, the example pseudorandom feature extractor 165, the example pseudorandom number generator 175, the example deterministic feature extractor 185, the example image classifier 190 and/or, more generally, the example image classifying apparatus 100 may be implemented by one or more circuit(s), programmable processors), application-specific integrated circuit(s) (ASIC(s)), programmable logic device(s) (PLD(s)), field-programmable logic device(s) (FPLD(s)), and/or field-programmable gate array(s) (FPGA(s)), etc. When any of the appended claims are read to cover a purely software and/or firmware implementation, at least one of the example image capture device 105, the example classification module 120, the example controller 140, the example databases 145, 150 and 195, the example detector 155, the example pseudorandom feature extractor 165, the example pseudorandom number generator 175, the example deterministic feature extractor 185, the example image classifier 190 and/or, more generally, the example image classifying apparatus 100 are hereby expressly defined to include a tangible computer-readable medium such as a memory, a memory device, a digital versatile disc (DVD), a compact disc (CD), a hard disk, a floppy disk, etc. storing the firmware and/or software, Further still, the example image classifying apparatus 100 may include interfaces, data structures, elements, processes and/or devices instead of, or in addition to, those illustrated in FIG. 1 and/or may include more than one of any or all of the illustrated interfaces, data structures, elements, processes and/or devices.

Figure 2:
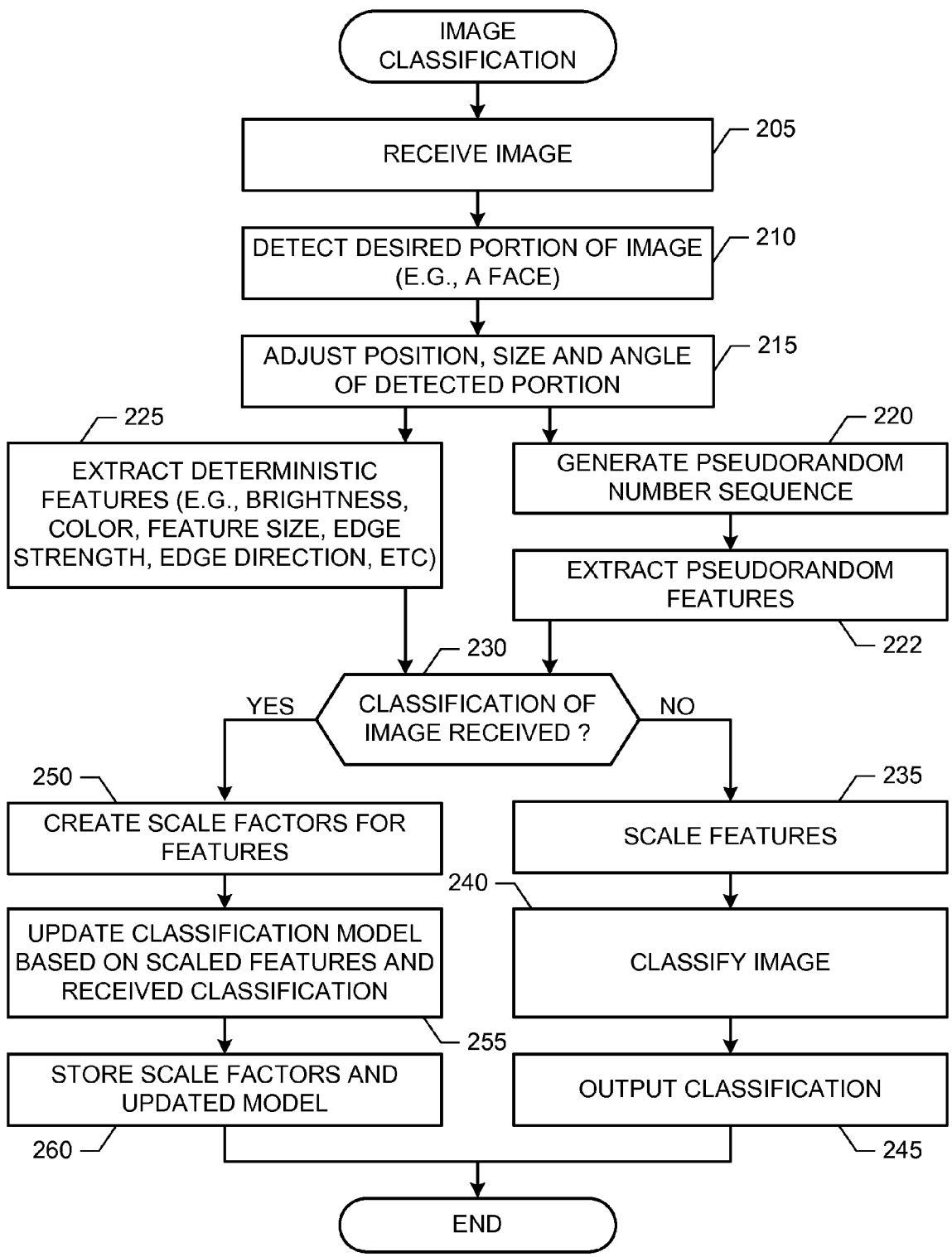
FIG. 2 is a flowchart representative of example machine-accessible instructions that may be executed by, for example, a processor, to implement the example image classifying apparatus of FIG. 1.
Figures 3, 4, 5:
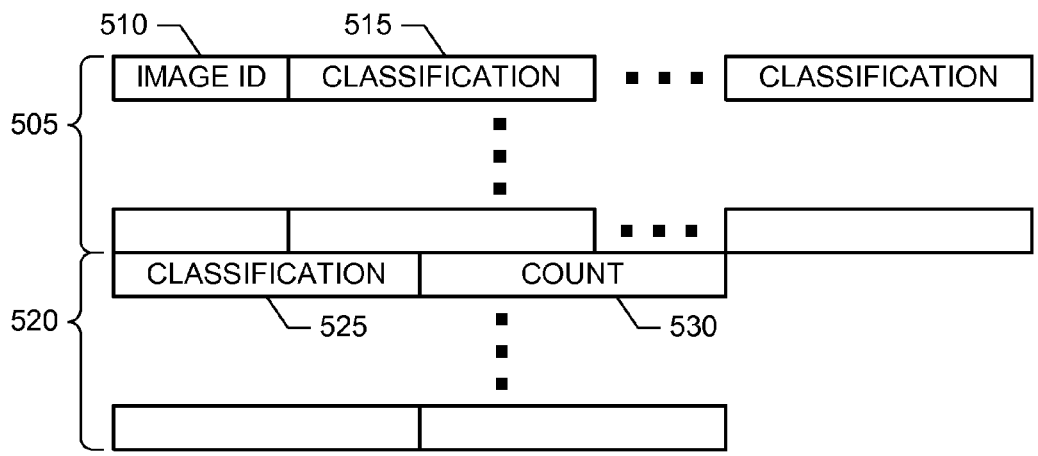
FIG. 3 illustrates example machine-accessible instructions that may be executed by, for example, a processor, to implement the example pseudorandom feature extractor of FIG. 1.
FIG. 4 illustrates example machine-accessible instructions that may be executed by, for example, a processor, to implement the example pseudorandom number generator of FIG. 1.
FIG. 5 illustrates an example data structure that may be used to implement the example results database of FIG. 1.

FIGS. 2, 3 and 4 illustrate example machine-accessible instructions that may be executed to implement the example image classifying apparatus 100 of FIG. 1. A processor, a controller and/or any other suitable processing device may be used and/or programmed to execute the example machine-accessible instructions of FIGS. 2, 3 and/or 4. For example, the machine-accessible instructions of FIGS. 2, 3 and/or 4 may be embodied in coded instructions stored on a tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other tangible medium that can be used to store program code and/or instructions in the form of machine-readable instructions or data structures, and which can be accessed by a processor, a computer and/or other machine having a processor, such as the example processor platform P100 discussed below in connection with FIG. 6. Combinations of the above are also included within the scope of computer-readable media. Machine-readable instructions comprise, for example, instructions and data that cause a processor, a computer and/or a machine such as a processor to perform one or more particular processes. Alternatively, some or all of the example machine-accessible instructions of FIGS. 2, 3 and/or 4 may be implemented using any combination(s) of ASIC(s), PLD(s), FPLD(s), FPGA(s), discrete logic, hardware, firmware, etc. Also, some or all of the example processes of FIGS. 2, 3 and/or 4 may be implemented manually or as any combination of any of the foregoing techniques, for example, any combination of firmware, software, discrete logic and/or hardware. Further, many other methods of implementing the example operations of FIGS. 2, 3 and/or 4 may be employed. For example, the order of execution of the blocks may be changed, and/or one or more of the blocks described may be changed, eliminated, subdivided, or combined. Additionally, any or all of the example machine-accessible instructions of FIGS. 2, 3 and/or 4 may be carried out sequentially and/or carried out in parallel by, for example, separate processing threads, processors, devices, discrete logic, circuits, etc.

The example machine-accessible instructions of FIG. 2 begin with the example classification module 120 receiving a captured image 110 from the example image capture device 105 or a training image 130 from the example controller 140 (block 205). The example detector 155 identifies and/or extracts a portion of the image 110, 130 (block 210), and adjusts and/or normalizes the extracted portion to form a normalized image 160 (block 215).

The example pseudorandom number generator 175 resets its seed and/or state and generates the example pseudorandom number sequence 167 (block 220). The example pseudorandom feature extractor 165 extracts (e.g., computes) the pseudorandom image features 170 for the normalized image 160 based on the pseudorandom number sequence 167 (block 222). In some examples, the example deterministic feature extractor 185 additionally extracts (e.g., computes) one or more deterministic image features 180 for the normalized image 160 (block 225).

If a classification 125 is not known for the normalized image 160 and/or the corresponding image 110, 130 or object 115 that it is based on (block 230), the example image classifier 190 forms an image feature vector based on the extracted features 170 (and, in some examples, the features 180), and scales the image feature vector with one or more parameters and/or variable stored in the example model database 195 (block 235). The image classifier 190 classifies the normalized image 160 (and/or the object 115 that it is based on) based on the scaled image feature vector (block 240), and outputs the resulting classification 125 (block 245). Control then exits from the example machine-accessible instructions of FIG. 2.

Returning to block 230, if the classification 125 for the normalized image 160 and/or the corresponding image 110, 130 or object that it is based on is known (block 230), the image classifier 190 updates its classification model 195 by creating and/or updating one or more image feature vector scale factors (block 250), updating one or more classification hyperplanes (block 255) and/or storing the updated scale factors and/or hyperplanes in the example model database 195 (block 260). Control then exits from the example machine-accessible instructions of FIG. 2.

The example machine-accessible instructions of FIG. 3 may be executed to implement the example pseudorandom feature extractor 165 of FIG. 1 for a normalized image 160 under consideration. The example machine-accessible instructions of FIG. 3 compute npair (e.g., 1000) pseudorandom image features 170 for the presently considered normalized image 160. The example pseudorandom feature extractor 165 resets the state ml_srand of the pseudorandom number generator 175 (line 302). For each pseudorandom image feature 170 (lines 305), the example pseudorandom feature extractor 165 pseudorandomly selects a sample location (x3, y3) within the normalized image 160 based on pseudorandom numbers generated by, for example, executing the example machine-accessible instructions of FIG. 4 (lines 310). At each location (x3, y3) the example pseudorandom feature extractor 165 pseudorandomly selects a sampling resolution (dx, dy) based on pseudorandom numbers generated by, for example, executing the example machine-accessible instructions of FIG. 4 (lines 315). The location (x3, y3) and the resolution (dx, dy) define a region of the normalized image 160, and/or a boundary and/or extent of the region. The example pseudorandom feature extractor 165 computes an average ave 170 over the defined region, that is, an average of the pixels or and/or contained within the defined region. Other example pseudorandom image features 170 that may be computed by the example pseudorandom feature extractor 165 include, but are not limited to, vertical edge strength at a random location determined by two pseudorandom numbers, horizontal edge strength at a random location determined by two pseudorandom numbers, color at a random location determined by two pseudorandom numbers, and/or predominate edge direction at a random location determined by two pseudorandom numbers.

The example machine-accessible instructions of FIG. 4 may be executed to generate the pseudorandom sequence of numbers 167. Based on the previous state ml_srand of the pseudorandom number generator 175, the example machine-accessible instructions of FIG. 4 computes and returns the next pseudorandom number ml_srand 167 (lines 405).

An example set images was classified using the example methods and apparatus of FIGS. 1-4. The test images were taken from the so-called "Labeled Faces in the Wild" image database from the University of Massachusetts public archives (at the time of filing, this was publicly available at http://vis-www.cs.umass.edu/lfw). This database contains a diverse set of 250×250 pixel facial images having arbitrary backgrounds that were gathered from the Internet. The Viola-Jones face detector was used to generate these 250×250 pixel facial images from larger images. Because this database does not specify gender for the images, the gender of each image was inferred from the name associated with each image.

The images were converted to grayscale and used as input normalized images 160 for the example pseudorandom feature extractor 165. No deterministic image features 180 were used. Gender classification accuracy was computed using 10-fold cross validation. In this procedure, the set of test images is divided into 10 subsets of equal size. Each subset is tested after the remaining 9 subsets are used to train the image classifier 190. Thus, every image in the set of test images is predicted once. The cross-validation accuracy is the percentage of images that were correctly classified. The methods and apparatus described herein were able to correctly classify the gender of 72% of the test images. In contrast, a commercially available face detection system was only able to achieve approximately 63% gender accuracy for facial images captured in a controlled lab environment mimicking a store environment.

FIG. 5 illustrates an example data structure that may be used to implement the example results database 150 of FIG. 1. The example data structure of FIG. 5 includes a plurality of entries 505 for respective ones of classified images 110, 130 and 160. To identify an image 110, 130, 160, each of the example entries 505 of FIG. 5 includes an image identifier (ID) field 510. Each of the example image identifier fields 510 of FIG. 5 contains one or more numbers and/or letters that uniquely identify a particular image 110, 130, 160.

To store the classification(s) 125 identified for the image 110, 130, 160 identified in a corresponding image identification field 510, each of the example entries 505 of FIG. 5 includes one or more classification fields 515. The example classification fields 515 of FIG. 5 contain one or more numbers and/or letters corresponding to a particular classification 125 identified by the image classifier 190. As shown in FIG. 5, an image 110, 130, 160 may be assigned more than one classification 125.

The example data structure of FIG. 5 also includes a plurality of entries 515 for respective ones of classifications 125. To identify a classification 125, each of the example entries 520 of FIG. 5 includes a classification field 525. The example classification fields 525 of FIG. 5 contain one or more numbers and/or letters corresponding to a particular classification 125.

To store the number of times that the corresponding classification 525 has occurred in a sequence and/or set of images 110, 130, 160 each of the example entries 520 of FIG. 5 includes a count field 530. Each of the example count fields 530 of FIG. 5 stores a number that represents the number of times that the classification 125 identified in the corresponding classification field 525 occurred in a particular combination of images 110, 130, and/or 160.

While an example data structure that may be used to implement the example results database 150 has been illustrated in FIG. 5, one or more of the entries and/or fields may be combined, divided, re-arranged, omitted, eliminated and/or implemented in any other way. Moreover, the example data structure of FIG. 5 may include fields instead of, or in addition to, those illustrated in FIG. 5 and/or may include more than one of any or all of the illustrated fields.

Figure 6:
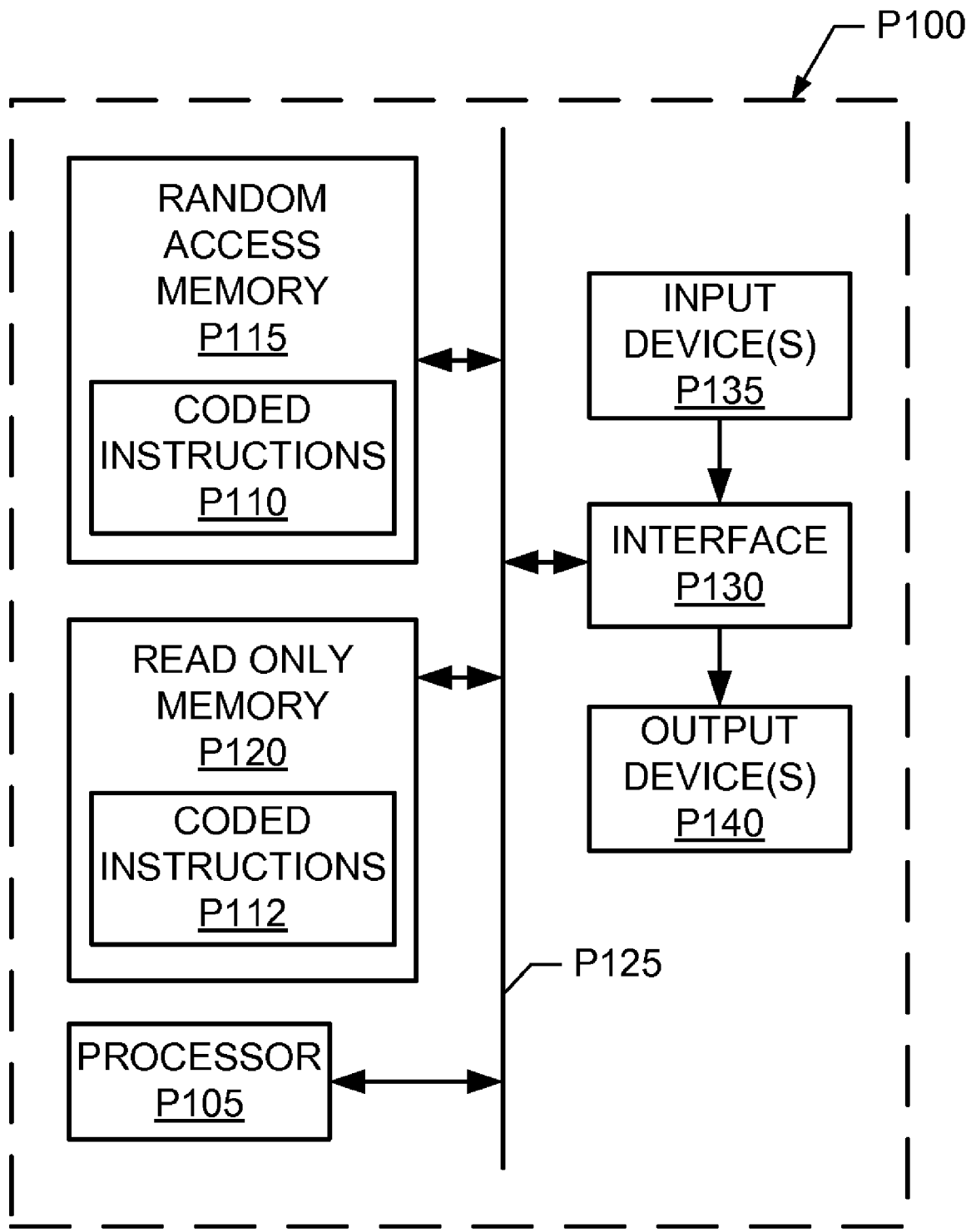
FIG. 6 is a schematic illustration of an example processor platform that may be used and/or programmed to carry out the example machine-accessible instructions of FIGS. 2-4, and/or to implement any or all of the example methods and apparatus described herein.

FIG. 6 is a schematic diagram of an example processor platform P100 that may be used and/or programmed to implement the example image classifying apparatus 100 of FIG. 1. For example, the processor platform P100 can be implemented by one or more general-purpose processors, processor cores, microcontrollers, etc.

The processor platform P100 of the example of FIG. 6 includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine-accessible instructions of FIGS. 2, 3 and/or 4 to implement the example image classification methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to, for example, implement the example databases 145, 150 and 195 of FIG. 1.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices PBS may be used to, for example, to implement the example image capture device 105.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
generating first and second pseudorandom numbers;
extracting a first feature of an image based on the first and second pseudorandom numbers; and
determining a classification for the image based on the extracted first feature, wherein extracting the first feature of the image comprises:
identifying a location of a region of the image based on the first and second pseudorandom numbers; and
computing an average of pixels of the identified region.

2. A method as defined in claim 1, wherein generating the first pseudorandom number comprises selecting the first pseudorandom numbers from a sequence of numbers approximating a random number property.

3. A method as defined in claim 1, wherein extracting the first feature of the image further comprises:
computing at least one of an edge strength, an edge direction, or a color at the identified location.

4. A method as defined in claim 1, wherein the first feature is extracted from the identified region.

5. A method as defined in claim 1, further comprising deterministically extracting a second feature of the image, wherein determining the classification is based on the first and second features.

6. A method as defined in claim 5, wherein the second, feature is at least one of a brightness, a color, a position, a feature size, an edge strength, or an edge direction.

7. A method as defined in claim 1, wherein determining the classification for the image comprises:
providing the first extracted feature into a support vector machine; and
receiving the classification from the support vector machine.

8. A method as defined in claim 1, further comprising:
receiving a second image and a second classification for the second image;
extracting a second feature of the second image based on the first and second pseudorandom numbers; and
training an image classifier based on the second feature and the second classification.

9. A method as defined in claim 1, wherein generating the first pseudorandom number approximates a property of a random number.

10. A method as defined in claim 1, wherein extracting the first feature of the image comprises:
generating third and fourth pseudorandom numbers; and
identifying the location of the region of the image based on the first, second, third and fourth pseudorandom numbers.

11. A method as defined in claim 1, wherein extracting the first feature of the image comprises identifying an extent of the region.

12. A method as defined in claim 1, wherein the region comprises a facial portion of the image.

13. A method as defined in claim 1 further comprising:
extracting a second feature of the image based on the first and second pseudorandom numbers; and
determining the classification of the image based on the first and second extracted features.

14. A method as defined in claim 1 further comprising setting a pseudorandom number generation state.

15. A method as defined in claim 1, wherein the image comprises a representation of a person and the classification comprises a gender of the person.

16. An apparatus comprising:
a pseudorandom number generator to generate one or more pseudorandom numbers;
a feature extractor to extract a first feature of an image based on the one or more pseudorandom numbers by identifying a region of the image based on the one or more pseudorandom numbers and computing an average of pixels of the identified region; and
a classifier to determine a classification for the image based on the first extracted feature.

17. An apparatus as defined in claim 16, wherein the number generator is to generate one or more additional pseudorandom numbers, and wherein the feature extractor is to identify the region of the image based on the one or more pseudorandom numbers and the one or more additional pseudorandom numbers.

18. An apparatus as defined in claim 16, wherein the first feature comprises at least one of an edge strength, an edge direction, or a color at the identified location.

19. An apparatus as defined in claim 16, further comprising a second feature extractor to deterministically extract a second feature of the image, wherein the classifier is to determine the classification based on the first and second features.

20. An apparatus as defined in claim 19, wherein the second feature is at least one of a brightness, a color, a position, a feature size, an edge strength, or an edge direction.

21. An apparatus as defined in claim 16, wherein the classifier comprises a support vector machine.

22. An apparatus as defined in claim 16, wherein the pseudorandom number generator comprises at least one of a linear congruential generator, a lagged Fibonacci generator, a linear feedback shift register, or a generalized feedback shift register.

23. A tangible computer readable storage comprising machine-readable instructions which, when executed, cause a machine to at least:
generate one or more pseudorandom numbers;
extract a first feature of an image by identifying a region of the image based on the one or more pseudorandom numbers and computing an average of pixels of the identified region; and
determine a classification for the image based on the first extracted feature.

24. A tangible computer readable storage as defined in claim 23, wherein the instructions further cause the machine to:
generate additional pseudorandom numbers; and
identify the region of the image based on the one or more pseudorandom numbers and the additional pseudorandom numbers.

25. A tangible computer readable storage as defined in claim 23, wherein the instructions further cause the machine to:
receive a second image and a second classification for the second image;
extract a second feature of the second image based on the one or more pseudorandom numbers; and
train an image classifier based, on the second feature and the second, classification.

26. A tangible computer readable storage as defined in claim 23, wherein the first feature of the image comprises at least one of an edge strength, an edge direction, or a color at the identified location.

* * * * *